P. BROWN AND F. J. BOSTOCK.
MECHANISM OR MECHANICAL MOTION FOR IMPARTING ALTERNATE SLOW AND QUICK MOTIONS.
APPLICATION FILED NOV. 19, 1917.

1,316,826.

Patented Sept. 23, 1919.
3 SHEETS—SHEET 2.

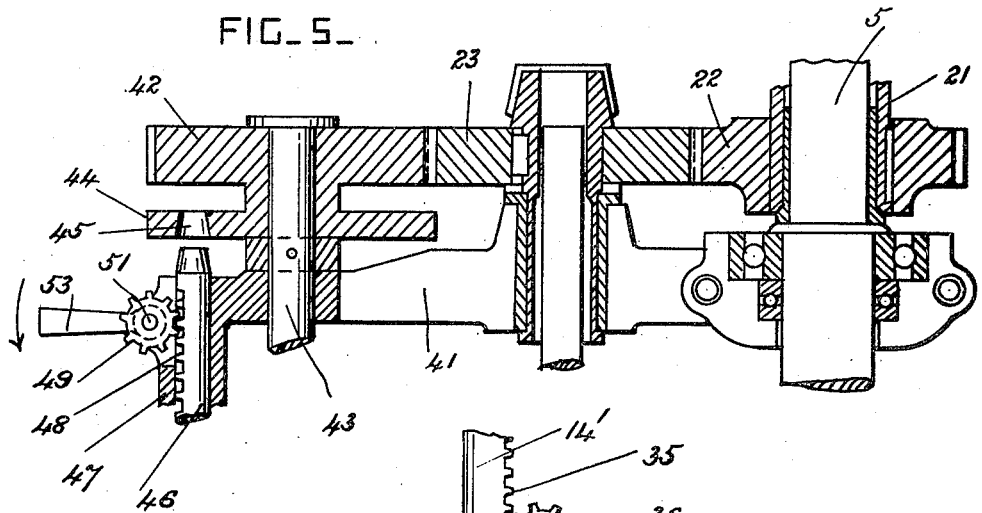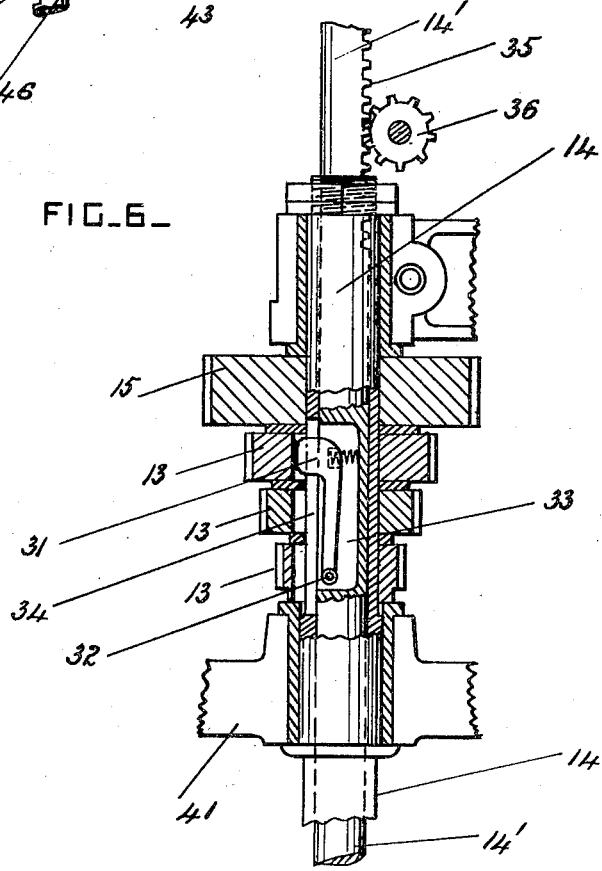

UNITED STATES PATENT OFFICE.

PERCY BROWN AND FRANCIS J. BOSTOCK, OF HUDDERSFIELD, ENGLAND.

MECHANISM OR MECHANICAL MOTION FOR IMPARTING ALTERNATE SLOW AND QUICK MOTIONS.

1,316,826.     Specification of Letters Patent.     Patented Sept. 23, 1919.

Application filed November 19, 1917. Serial No. 202,757.

*To all whom it may concern:*

Be it known that we, PERCY BROWN and FRANCIS JOHN BOSTOCK, subjects of King George V of Great Britain, residing at Huddersfield, in the county of York, England, have invented a new and useful Improvement in Mechanism or Mechanical Motion for Imparting Alternate Slow and Quick Motions, of which the following is a specification.

This invention relates to means for imparting an alternate slow and quick motion to a given operating part of a machine such for instance, as the saddle carrying the cutters for cutting the teeth of double helical wheels, or other tool or operating device which is required to make a slow movement in one direction and a quick return movement, the object of the improvements being to produce a motion or mechanism which will permit of such alternate motions being imparted to the designed object without causing back-lash and, if desired, a part of the mechanism employed which receives a periodic motion, can operate any given object required to act in unison with the alternate slow and quick motion, our improvements differing materially from the usual epicyclic gears for giving variable speeds and from reversing motions embodying a differential and compound gearing or double differentials driven at different speeds, and comprising according to one embodiment of the invention, internal and external differential motions the planet bevel pinions of which are mounted on diametrically disposed arms or spindles forming a part of or secured to a boss or collar fast on a central spindle or shaft whose rotary motion is controlled by said differential motions and means for giving motion thereto, and, by alternate slow and quick rotary movements imparted to said spindle cause by means of a screw thread on one end thereof working through a nut, or by other equivalent means, an alternate slow and fast movement to be imparted to the designed object.

In operating the central shaft in opposite directions at different speeds through two differential motions according to our invention the stresses are distributed throughout the gearing for giving motion to the differentials and each change is made entirely without back-lash.

In another embodiment of the invention the two differentials may be located on separate portions of the shaft or spindle which is to receive the alternate slow and quick motion, this arrangement being preferable in cases where the inertia of the external differential would interfere with the operation of the parts.

Our invention will be fully described with reference to the accompanying drawings, in which:—

Fig. 5 is a sectional side view of one form of means for arresting the movement of the wheel 22 shown in Fig. 1, said Fig. 5 being a continuation of the left hand portion of Fig. 1.

Fig. 6, is a detail view of shaft 14 and adjacent parts, shown in Fig. 1, but showing also the catch mechanism.

Figure 1:
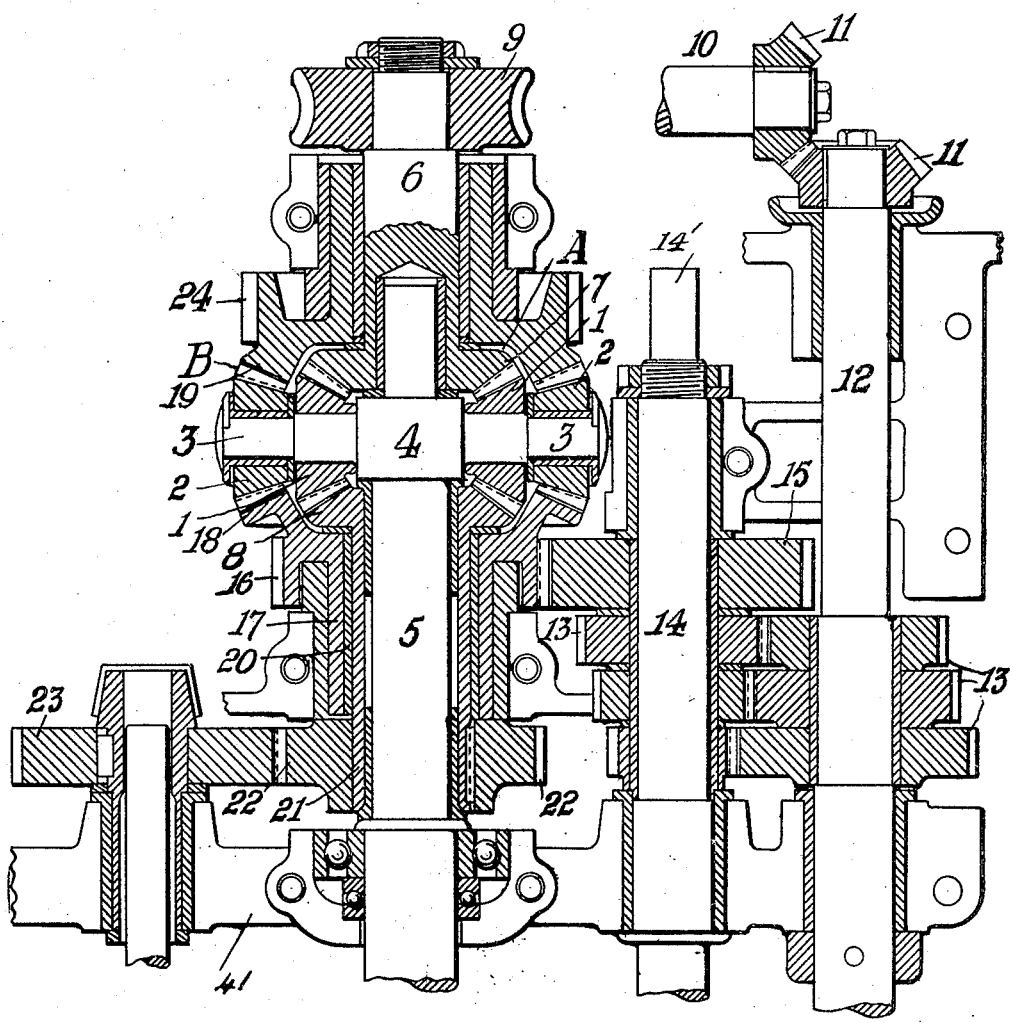
Figure 1 is a sectional elevation of one embodiment of our improved double or combined differential motion for imparting an alternate slow and quick motion to any given operating part of a machine.

Referring to the drawings and firstly to Fig. 1 showing the preferred embodiment of our invention, we employ two differential motions A and B of the bevel gear type in this instance arranged symmetrically one within the other, the planet bevel pinions 1 of the internal differential A and the planet bevel puinions 2 of the external differential B being mounted on diametrically disposed arms or spindles 3 forming a part of or secured to a boss or collar 4 and constituting a crosshead which is fast on a central spindle or shaft 5 whose rotary motion is to be controlled by the said differential motions and means for giving motion thereto and, by alternate slow and quick rotary movements imparted to said spindle cause by means such as a screw thread on the end of the shaft working through a nut or by other equivalent means, an alternate slow and fast movement to be imparted to the designed object.

Above the cross head 4 the shaft or spindle 5 is suitably reduced in diameter and enters a liner or sleeve in a recess in the end of the shaft 6 of the upper bevel wheel 7 of the pair of bevel wheels 7, 8 forming a part of the internal differential gear A.

The outer end of the shaft 6 of said bevel gear has mounted thereon a worm wheel 9 which meshes with a worm (not shown) fast on a shaft 10 geared up through bevel wheels 11 to the feed shaft 12 which is preferably geared up through speed cones 13 on the feed shaft 12 and on a driven shaft 14 and spur wheel 15 mounted on said driven shaft 14, with a spur wheel 16 integral with the hollow extended boss 17 of the lower bevel wheel 18 of the pair of bevel wheels 18, 19 of the external differential gear B, the said hollow boss 17 being mounted on a sleeve 20 on the hollow boss 21 of the lower bevel wheel 8 of the internal differential gear which said boss in turn is mounted on a liner or sleeve on the central shaft or spindle 5. The change wheels 13 on the countershaft 14 are provided with catch mechanism of approved construction, not shown in Fig. 1, which locks any one of them to the shaft 14. This catch mechanism is slidable inside the shaft 14, which is hollow, and it is slid longitudinally of the shaft 14 by means of its spindle 14′ which projects from the upper end of the shaft 14. The shaft 14 with its change wheels is arranged to have a greater frictional resistance to rotation than the lower beveled wheel 8 which is mounted on the shaft 5. On the outer end of the boss 21 is splined a spur wheel 22 gearing with a spur wheel 23 forming one of a train of change or holding gears (not shown) such as are commonly controlled by a dividing or like motion. The second bevel wheel 19 of the external differential is mounted on a sleeve or liner on the shaft 6 of the bevel wheel 7 of the internal differential and integral with said bevel wheel 19 or secured thereto is a spur wheel 24 which is geared up to the main drive from the gear box of the machine by any ordinary means which it is not necessary to show on the drawings.

A suitable form of catch mechanism, shown in Fig. 6, comprises a lever key 31 pivoted by a pin 32 to the spindle 14′, and arranged in a recess 33 in said spindle. This key lever has its free end portion pressed laterally through a slot 34 in the hollow shaft 14, and adapted to engage with keyways formed in the hubs of the toothed wheels which are mounted on the said shaft 14. The spindle 14′ has a toothed rack 35 on its projecting upper end portion, and a revoluble toothed wheel 36 is arranged in gear with the rack, and affords a means for sliding the spindle 14′ longitudinally in the shaft 14.

A suitable form of device for arresting the motion of the wheel 22 is shown in Fig. 5, which also shows portions of the parts shown in the left hand lower part of Fig. 1. The frame 41 which supports the wheels 22 and 23, also supports a toothed wheel 42, which is mounted on a shaft 43, and which gears into the wheel 23. A disk or dividing wheel 44 is secured to the wheel 42, and has one or more holes 45 in it. A plunger 46 is slidable in a guide 47 on the frame 41, and has a toothed rack 48 on one side. A toothed pinion 49 is secured on a shaft 51 journaled at one side of the guide 47, and gears into the toothed rack 48. The shaft 51 has a handle 53 secured on it, and when the handle is moved in the direction of the arrow in Fig. 5, either by hand or by any automatic mechanism suitable for that purpose, the plunger 46 enters the hole 45 and thereby arrests the motion of the wheel 22 by locking the disk 44 to the stationary frame 41.

The parts arranged as above described operate as follows:—

For the slow or feed stroke of the cutting tool or analogous part, motion from the main drive of the gear box is transmitted through the spur wheel 24, external differential motion B, speed cones 13 feed shaft 12 and bevel wheels 11 to the shaft 10 and through the worm thereon (not shown) and worm wheel 9 to the shaft 6 of the bevel wheel 7 of the internal differential motion. The said bevel wheel 7 is thus rotated and the bevel wheel 8 of the internal differential being held meanwhile by the inaction of the change or holding gears, geared up to the toothed wheel 22, the bevel pinions 1 of the internal differential motion are rotated by the bevel wheel 7 and caused to travel in a circular path over the bevel wheel 8 in one direction and thus give a slow motion to the central shaft 5 in the reverse direction to that of the wheel 24 and, through the screw or other means thereon, a corresponding slow movement to the tool or other part which it is designed to operate.

When the limit of motion of the tool or other part has been reached a plunger is automatically withdrawn in any known manner from a dividing wheel or other equivalent device for determining or controlling the change thus releasing the change or holding gears with the result that the bevel wheel 8 of the internal differential and the change gears are now free to rotate and the slow motion of the central shaft 5 consequently ceases. The shaft 14 having a greater resistance than the shaft 5 now becomes inoperative and therefore holds the spur wheel 16 and bevel wheel 18 stationary whereupon the power previously passing through the internal gear now passes through the external differential from the wheel 24 the bevel pinions 2 being rotated by the bevel wheel 19 and caused to travel in a circular path over the bevel wheel 18 and thus rotate the shaft 5 at an accelerated speed in a contrary direction.

The next change to transmit rotary motion through the internal differential to the center shaft 5 at a slow speed takes place immediately the return or quick stroke has been made and is brought about by the reengagement of the plunger with the dividing wheel and the consequent prevention of rotation of the change or holding gears 23, gear 22 and bevel wheel 8 of the internal differential and the re-transmission of motion through the shaft 14. These changes take place immediately the predetermined or set limits of travel have been reached in each direction as determined by the dividing or like controlling mechanism employed.

In operating the shaft 5 in opposite directions at different speeds through two separate differential motions in the manner described, the stresses are distributed throughout the gearing for giving motion to the differentials and each change from a slow to a quick motion and from a quick to a slow motion is made entirely without backlash, which is essential and advantageous in producing work of accuracy and precision.

In the employment of the double differential motions for the purpose set forth the driven shaft 14 receives a periodic motion which may be imparted by said shaft to any other given object required to act in unison with the alternate slow and quick motion.

Instead of the arrangement of double differential motions for imparting an alternate slow and quick motion to the central shaft or spindle 5 as before described, we may obtain equally good results by separating the differentials and locating them on different parts of the same spindle or shaft which is suitably lengthened for the purpose.

Figure 2:
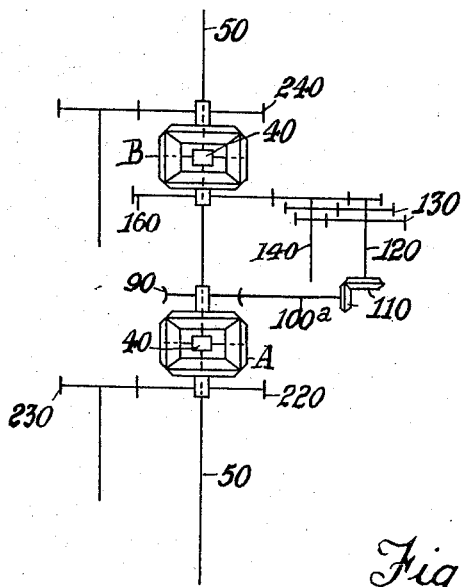
Figs. 2, 3 and 4 are diagrammatic views of modified applications of our improvements.
Figure 3:
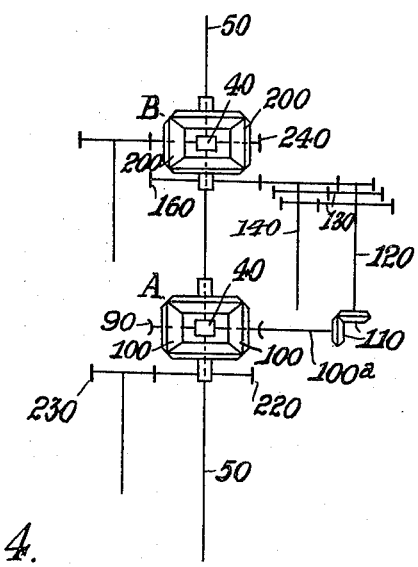
Figure 4:
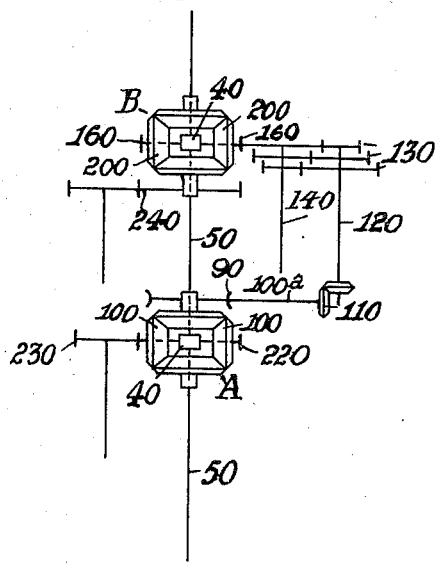

This modification of our invention is illustrated diagrammatically in Figs. 2, 3 and 4 showing three arrangements or combinations in the arrangement of the gears.

In Fig. 2, one gear in the differential B is geared up through the spur wheel 240 to the main drive from the gear box while a second gear in said differential is geared up through the spur wheel 160 and speed cones 130 to the feed shaft 120. One of the gears in the second differential A is geared up through worm wheel 90, worm (not shown) on shaft 100ª and bevel wheels 110 with the feed shaft 120 and a second gear of said differential A is geared up through spur wheel 220 with the change or holding gears 230. In the above arrangement each crosshead 40 is fast on the shaft 50.

The operation of the device shown in Fig. 2 is as follows: Assuming that the gear 230 is held stationary by the dividing motion, which is a known motion for holding mechanism for a given period of time and then releasing it for a period of time, then gear 220 is held stationary, as is also the bevel in differential A connected to said gear 220. The position therefore is, that one bevel in one differential (A) is held stationary while all the other bevels in each differential are free to rotate. The main drive imparts a constant drive to gear 240 and to the bevel of differential B integral therewith, said bevel transmitting motion through gear train 160, 130, 120, 110, 100ª, and 90 gives motion to differential A through its upper bevel. As the lower bevel in said differential A is held stationary, the planet pinions are carried bodily around and through their connection with the lower spider 40; the shaft 50 is rotated in one direction. The rotation of the shaft 50 will cause the planet pinions in the differential B to be carried around with it because the upper spider is fast to shaft 50, but such planet pinions merely travel around in mesh with their respective bevel gears without interfering with the motion transmitted through the lower differential A to the shaft 50 or with the rotation of said shaft. The shaft 50 is therefore rotated in one direction at a slow speed until the moment arrives when the dividing motion releases the gear 230. This releases gear 220 and the bevel wheel connected thereto, and shaft 50 ceases to be driven. Now the shaft 140 with its gears has a greater resistance to motion than the holding gear train, and it becomes stationary with the result that gear 160 is held and also the bevel of differential B connected therewith. This being so, the planet pinions in differential B are carried around by the drive through the upper bevel of differential B, and the shaft 50 is driven in the contrary direction at an increased speed, the planet pinions in the lower differential A being carried around with the shaft 50 without interfering with the drive of said shaft.

The spiders 40 being secured to shaft 50 must rotate therewith, each of said spiders in turn forming the driver, and when not forming the driver rotating freely with the shaft and carrying the respective planet pinions idly around the bevels of the respective differentials.

In the alternative arrangement shown in Fig. 3, the pinions 200 in the differential B are geared up through the spur wheel 240 with the main drive from the gear box and one of the bevel wheels in said differential is geared up through the spur wheel 160 and speed cones 130 to the feed shaft 120. In the differential A the bevel pinions 100 are geared up through the worm wheel 90, worm (not shown) on shaft 100ª and bevel wheels 110 to the feed shaft 120 and one of the bevel wheels in said differential A is geared up through spur gear 220 with the change or holding gears 230. In this instance the crossheads 40 carrying the bevel pinions in each differential are loose on the shaft 50 and the upper bevel wheel in each of such differentials is fast on the shaft 50.

In the further alternative arrangement illustrated at Fig. 4, the bevel pinions 200 in the differential B are geared up through spur wheel 160 and speed cones 130 with the feed shaft 120 and one of the bevel wheels of said differential is geared up through spur wheel 240 with the main drive from the gear box. The bevel pinions 100 in the differential A are geared up through spur wheel 220 with the change or holding gears 230 and one of the bevel wheels in said differential is geared up through worm wheel 90, worm (not shown) on shaft 100$^a$ and bevel gears 110 with the feed shaft 120. In this instance also, the crossheads 40 in each differential are loose on the shaft 50 and one of the bevel wheels in each of said differentials namely the bevel wheel not geared to an external part, is fast on the shaft 50.

In the arrangements shown it will be understood that the central shaft or spindle 50 may be driven alternately in opposite directions at a slow and quick speed by the crossheads forming a part of each differential or from one of the gears of each of said differentials fast on the central shaft. If one of the differentials should be mounted on a separate shaft, motion therefrom would be transmitted to the differential or crosshead 40 on the shaft 50 by gearing.

The speed at and the direction in which the spindle 50 is driven depend on the appropriate combination of the ratios and directions. The arrangement of two differentials to operate as hereinbefore set forth may be carried out by other forms of gearing and varied in many ways or arranged in different combinations without departing from our invention. If desired spur gears or equivalent means may be employed in place of bevel wheels in each differential.

Having thus described our invention, what we claim as new and desire to secure by Letters Patent is:—

1. In a mechanical movement, a driving shaft, two separate differential driving mechanisms each operatively connected with the said shaft, intermediate driving devices between the two said differential mechanisms for reducing the speed, means for arresting the movement of one element of each differential mechanism alternately, and means for driving one differential mechanism directly, the said shaft being revolved in one direction and slowly when driven through both differential mechanisms and the said intermediate driving devices, and being revolved rapidly and in the reverse direction when driven through one differential mechanism only.

2. In a mechanical movement, a driving shaft, two separate differential driving mechanisms each having its planetary members mounted on pins which project laterally from the said shaft, intermediate driving devices for reducing the speed, said devices being arranged between one element of each of the two differential mechanisms, means for driving one element of one differential mechanism directly, means for arresting the movement of one member of the other differential mechanism, whereby the said shaft is revolved slowly in one direction through both differential mechanisms and the said intermediate driving devices, and means for releasing the last said one member and arresting the movement of the corresponding other member of the differential mechanism to which the power is applied directly, thereby revolving the said shaft rapidly and in the reverse direction.

3. In a mechanical movement, a driving shaft, an internal differential driving mechanism and an external differential driving mechanism, each said mechanism having its planetary members mounted axially in line with each other on pins which project laterally from the said shaft, intermediate driving devices for reducing the speed, said devices being arranged between one element of the internal differential mechanism and one element of the external differential mechanism, means for driving one element of the external differential mechanism directly, means for arresting the movement of one member of the internal differential mechanism, whereby the said driving shaft is revolved slowly in one direction through both differential mechanisms and the said intermediate driving devices, and means for releasing the said one member of the internal differential mechanism and arresting the movement of the corresponding other member of the external differential mechanism, thereby revolving the said driving shaft rapidly and in the reverse direction.

In testimony whereof we affix our signatures in the presence of two witnesses.

PERCY BROWN.
FRANCIS J. BOSTOCK.

Witnesses:
 THOMAS H. BARRON,
 MARY BARRON.

Copies of this patent may be obtained for five cents each, by addressing the "Commissioner of Patents, Washington, D. C."